No. 842,223. PATENTED JAN. 29, 1907.
L. B. METCALF.
REVERSIBLE HARROW.
APPLICATION FILED JUNE 15, 1906.
2 SHEETS—SHEET 1.
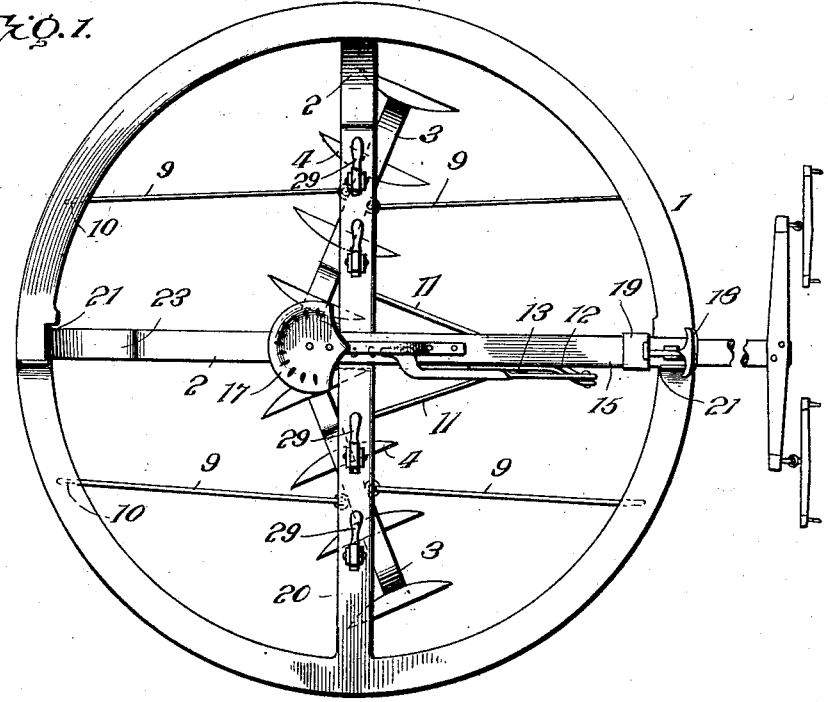
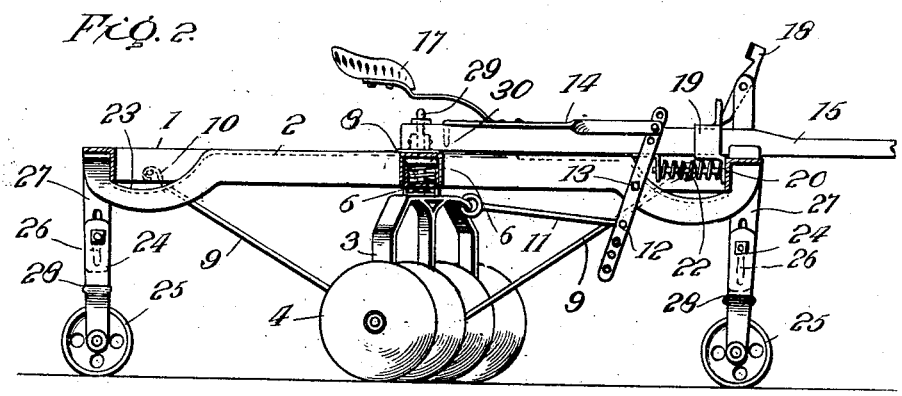
Inventor
L. B. Metcalf,
Witnesses
By
*Attorneys*

No. 842,223.
PATENTED JAN. 29, 1907.
L. B. METCALF.
REVERSIBLE HARROW.
APPLICATION FILED JUNE 15, 1906.
2 SHEETS—SHEET 2.
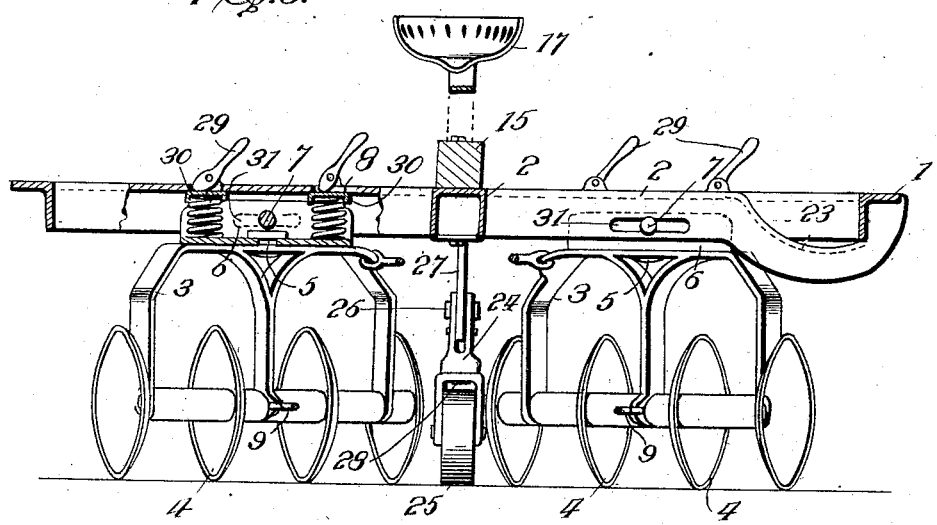
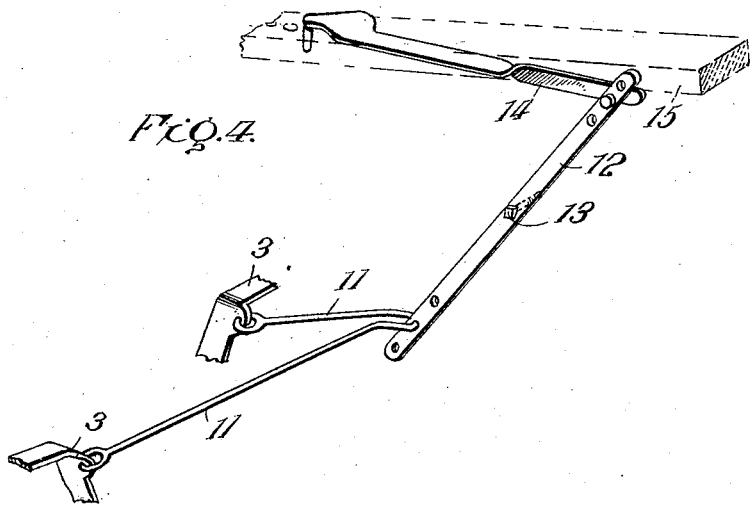
Inventor
L. B. Metcalf,
Witnesses
By _____, Attorneys

UNITED STATES PATENT OFFICE.

LEONARD B. METCALF, OF SPARTANBURG, SOUTH CAROLINA.

REVERSIBLE HARROW.

No. 842,223.

Specification of Letters Patent.

Patented Jan. 29, 1907.

Application filed June 15, 1906. Serial No. 321,925.

*To all whom it may concern:*

Be it known that I, LEONARD B. METCALF, a citizen of the United States, residing at Spartanburg, in the county of Spartanburg and State of South Carolina, have invented certain new and useful Improvements in Reversible Harrows, of which the following is a specification.

This invention embodies improvements in agricultural implements, and relates more particularly to the construction of disk harrows of the gang type.

One of the objects of the invention is to provide a novel mounting of the disk gangs whereby the same may be reversed when the implement has reached the side of a field without necessitating turning of the implement.

A further object of the invention is to provide novel draft means for the implement and special means for automatically effecting reversal of the disk gang or gangs on a reversal of the draft mechanism.

Still another object of the invention is to secure a peculiar connection between the disk gang or gangs and the frame of the implement, whereby the gang or gangs have yielding connection with the frame of the harrow and are thus adapted to yield as they engage an obstruction. This obviates the likelihood of breakage of the individual disks of the gangs, as under no conditions will they have to sustain the weight of the implement when engaged with an obstruction.

For a full understanding of the invention and the merits thereof and also to acquire a knowledge of the details of construction of the means for effecting the result reference is to be had to the following description and accompanying drawings, in which—

Figure 1 is a top plan view of a disk harrow embodying the invention. Fig. 2 is a longitudinal section through the implement. Fig. 3 is a transverse section, bringing out more clearly the connections between the disk gangs and the implement-frame. Fig. 4 is a detail view of detached parts of the operating mechanism.

Corresponding and like parts are referred to in the following description and indicated in all the views of the drawings by the same reference characters.

In the practical embodiment of the invention it is contemplated to utilize a frame for the harrow 1 which is circular in form and which has side portions thereof connected together by means of cross-bars 2, arranged at approximately a right angle to one another. The cross-bar 2, which is arranged transversely of the frame, with respect more particularly to the line of draft, has the frames 3 of the disk gangs 4 connected therewith. The disk gangs 4 are preferably two in number and are of the usual type, the disks being mounted upon a shaft supported by the sides of each frame 3. The mounting of the disk gangs 4, however, represents an essential feature of the present invention, the upper portion of each frame 3 of the gangs 4 having a king-bolt connection 5 with a bolster 6, which is directly attached to the cross-bar 2, which carries the disk gangs. The king-bolt connection 5 admits of turning movement of the gangs 4 about a vertical axis, the degree of turning movement being suitably regulated by operating mechanism and determining the cutting action of the disks of each gang 4 in an evident manner.

In addition to the turning movement of the disks of each gang 4, as above described, the frames 3 of the gangs 4 are adapted to yield vertically by reason of the mounting of the bolsters 6, to which they are attached. Each of these bolsters 6 is attached to the cross-bar 2, before mentioned, by means of the horizontal pivotal fastening 7 passing through side portions of the cross-bar 2 and the bolster 6. In other words, each bolster 6 is pivoted between its ends for vertical movement, but each end is held in a predetermined position by means of a spring 8, interposed between the same and the bar 2, to which the gangs 4 are attached. The springs 8 represent yieldable members interposed between opposite ends of each bolster 6 and the bar 2, to which it is attached, and it is contemplated that these springs may be substituted by any equivalent or similar yieldable members. The mounting of the bolster 6 is particularly advantageous in that as the implement advances over a field should one of the disks of either gang 4 strike an obstruction, as a rock, the frame which carries the gang including said disk can yield by pivotal movement on an axis represented by the pivot 7 either to the right or left and to a certain extent vertically by reason of its pivotal movement. The yielding of the frame 3, carrying the gang 4, will prevent the whole weight of the implement being supported by one of the disks of a gang, which under ordinary conditions of service will break the disk and necessitate replacement thereof. Brace-rods 9 are utilized to connect each disk gang 4 with the frame 1, a pair of said rods being used for each gang and connecting the gang-shaft centrally thereof with both the front and rear portions of the frame 1. The opposite ends of the brace-rods 9 are preferably provided with hooks 10, so as to permit of ready disengagement of the brace-rods from the parts which are connected thereby. Connecting-rods 11 are attached at one end to the upper portion of the frame 3 of each gang 4 and at the opposite end to the lower portion of a lever 12, said lever 12 being pivoted between its ends, as shown at 13, to the longitudinal bar 2 of the frame 1. The upper and lower ends of the lever 12 are preferably provided with a plurality of openings to admit of adjustable connection of the rods 11 with the lower end of the lever and similar adjustable connection of another rod 14 with a tongue 15, which constitutes a member of the draft mechanism employed for the implement.

The tongue 15 is pivoted at its inner end, as shown at 16, to the central portion of the cross-bars 2 or adjacent to the point where said cross-bars cross one another, and this tongue is adapted by its pivotal movement to be reversed, so as to occupy a position in which it extends forwardly or rearwardly from the frame 1, according to the direction in which the implement is advancing. Said tongue 15 carries a seat 17, upon which the driver of the implement is seated, and shortly in advance of the seat 17 is arranged a latch mechanism and foot-operating means therefor. The foot-operating means comprises a foot-lever adapted to be depressed by the foot of the driver of the implement, so as to move the latch or catch 19 longitudinally of the tongue 15. The catch 19 may be of any conventional type and embodies an engaging portion 20, arranged beneath the tongue 15 and adapted to enter a notch or recess 21, one of which is located on the inner side of the frame 1 of the implement at both the front and rear portions thereof. A spring 22 engages the portion 20 and is adapted to normally tend to force the catch 19 into engagement with the notches or recesses 21 of the frame 1. It will be understood that the engaging portion 20 of the catch 19 is adapted to move into contact with the inner edge portion of the frame 1 as the tongue 15 is moved pivotally to reverse the draft mechanism. Opposite end portions of the longitudinal bar 2 on the frame 1 are depressed adjacent to the extremities, as shown at 23, to permit the catch 19 to assume its positions engaging either of the notches or recess 21 of the frame 1. Furthermore, in order that the catch 19 may pass the cross-bar 2, which is arranged transversely of the frame 1, in the movement of the tongue 15, one end portion of the last-mentioned cross-bar 2 is formed with a depression similar to those of the cross-bar 2 longitudinal of the frame, this depression being indicated at 23 also. The rod 14, which connects the tongue 15 with the lever 12, is adapted for adjustable connection with the tongue 15, as said rod is formed with the hook to engage in any one of the plurality of openings in the rear end portion of the tongue. The adjustable connection between the tongue and the lever 12 is desirable in that the adjustment of the gangs 4 when the draft mechanism is in a predetermined position depends upon the adjustment of the connection 14. In other words, by adjusting the rod 14 with reference to the tongue 15 the disk-gangs may be arranged in alinement or they may be arranged so as to cut at an angle to one another, dependent upon actual conditions of service. Standards 24 project downwardly from the front and rear end portions of the frame 1 and have small ground-wheels 25 journaled thereon, said wheels 25 being designed to prevent the frame 1 from falling down at either end when the tongue 15 is being turned and guides a position about centrally transverse of the frame 1. As the implement is moving the wheels 25 are not in contact with the ground by reason of the fact that the standards 24, carrying said wheels, are shorter than the distance between the frame and the ground.

In the actual operation of the invention after the implement has reached a side of the field it is desired to reverse the direction of movement thereof. The driver on the seat 17 depresses or actuates the foot-lever 18, and thereby disengages the catch 19 from the recess or notch with which it is coöperating. The implement is of course at a standstill when this is done, and the driver then turns the draft-animals so as to turn the tongue 15 on its pivot 16 until said tongue is reversed, whereupon the catch 19 engages the opposite notch or recess and positions the draft mechanism with reference to the frame 1. The turning movement of the tongue 15 imparts movement of the lever 12 to the connection 14, and these gangs 4 are reversed by such movement of the lever 12. In other words, on reversal of the draft mechanism the disk gangs are automatically actuated or reversed and are then ready for the continued progress or advance of the implement in a new direction over the field. Of course when the tongue 15 is at an intermediate point in its turning movement the frame 1 is prevented from tipping over either rearwardly or forwardly by the wheels 25, carried by the standards 24. Furthermore, it is contemplated that the standards 24, to which the wheels 25 are attached, shall have adjustable pin-and-slot connection, (indicated at 26,) with vertical standards 27, extending down from the frame 1 at the front and rear portions thereof. By having the standards 24 adjustably connected with the standards 27 it will be observed that larger or smaller side disks can be supported by the gang-frame 3 and the wheels 25 may be positioned properly with reference thereto. Again, under certain conditions the wheels 25 may be so adjusted by the connection 26 as to readily permit of raising and lowering the same to regulate the degree of cutting action of the disk gangs 4. Each of the wheels 25 is preferably swiveled to its standards 24 to permit of free movement thereof, the swivel connection being indicated at 28.

A feature of importance in the mounting of the bolsters 6 resides in the provision of cam-levers 29 and engaging plates 30 at the upper ends of the springs 8. The cams of the levers 29, which are pivoted to the bars 2, are adapted to engage the plates 30, and when one of the levers 29 at one end of the bolster 6 is forced downwardly the tension of the adjacent spring is so increased as to cause one end of the gang-frame to be likewise moved downwardly to effect deeper cutting action of the adjacent end disks of the disk gang in a manner which will be readily apparent. With the above mechanism it is obvious that the disks at either the inner or outer end of each gang may be caused to cut deeper than the opposite end, as desired, and this is extremely advantageous in the practical use of the invention. Also the pivot-fastening 7, connecting each bolster 6 with the cross-bar 2, has its ends passing through slots 31 in said cross-bar 2, and this permits of adjusting the fastening 7 so as to cause the gang-frames to be farther apart or nearer together, as may be desired. The lower ends of the springs 8 rest loosely upon the bolster with which they engage and slide freely on the latter when said bolsters are adjusted toward and from one another.

The harrow may be used in connection with a long or short tongue, as desired.

Having thus described the invention, what is claimed as new is—

1. In a harrow of the class described, the combination of a supporting-frame, a tongue connected therewith and reversible relative thereto, disk gangs mounted on the frame, a lever pivoted between its ends to the frame, connecting means between one end of the lever and the disk gangs, and connecting means between the other end of said lever and the tongue, whereby said gangs will be reversed upon reversal of the tongue.

2. In a harrow of the class described, the combination of a supporting-frame, a tongue pivoted at one end to the central portion of said frame, a plurality of disk gangs mounted on the frame, a lever pivoted to the frame, adjustable connecting means between one end of the lever and the disk gangs, adjustable connecting means between the other end of the lever and the tongue, whereby on reversal of the tongue with regard to the main supporting-frame, the disk gangs will be reversed, and means for holding the tongue in an adjusted position on the frame.

3. In a harrow, the combination of a main supporting-frame, disk-gang frames mounted thereon, bolsters connecting said gang-frames with the main frame, adjustable pivotal fastenings connecting the bolsters between the ends thereof with the main frame and permitting of adjustment of the disk-gang frames toward and from one another, and springs interposed between the opposite ends of the bolsters and the main frame.

4. In a harrow of the type described, the combination of a supporting-frame, a reversible tongue mounted thereon, disk gangs mounted on the frame, means admitting of reversal of the tongue with reference to the frame, and a lever operatively connecting the tongue with the disk gangs for automatically reversing the gangs when the tongue is reversed.

5. In a harrow of the type described, the combination of a supporting-frame, a reversible tongue mounted thereon, disk gangs mounted on the frame, means admitting of reversal of the tongue with reference to the frame, and a lever adjustably connected with the tongue and connected also with the gangs for effecting automatic reversal of the latter when the tongue is reversed.

6. In a harrow of the type described, the combination of a frame, disk gangs mounted thereon, draft mechanism connected with the frame and reversible with reference thereto, and adjustable means connecting the draft mechanism with the disk gangs for effecting automatic reversal of the gangs when the draft mechanism is reversed.

7. In a harrow of the type described, the combination of a main supporting-frame yieldably-mounted bolsters carried by said frame, disk-gang frames pivotally connected with said bolsters, and disks mounted in the disk-gang frames.

8. In a harrow of the type described, the combination of a main supporting-frame, yieldably-mounted bolsters pivotally connected with the supporting-frame and movable about a horizontal axis, disk-gang frames, king-bolt connection between the gangs and the bolsters aforesaid, and disk gangs mounted in the disk-gang frames.

In testimony whereof I affix my signature in presence of two witnesses.

LEONARD B. METCALF. [L. S.]

Witnesses:
  ROBERT J. GANTT,
  RALPH K. CARSON.